United States Patent
Nadaf et al.

(10) Patent No.: US 11,627,037 B2
(45) Date of Patent: Apr. 11, 2023

(54) MANAGEMENT AND ORCHESTRATION OF HETEROGENEOUS NETWORK ENVIRONMENT USING DYNAMIC, ROBUST AND NETWORK AWARE MICROSERVICES

(71) Applicant: Tata Consultancy Services Limited, Mumbai (IN)

(72) Inventors: Shameem Raj Mohinuddin Nadaf, Bangalore (IN); Sipra Behera, Bangalore (IN); Nikita Trivedi, Bangalore (IN); Bighnaraj Panigrahi, Bangalore (IN); Hemant Kumar Rath, Bhubaneswar (IN); Garima Mishra, Bangalore (IN); Sumanta Patro, Bhubaneswar (IN)

(73) Assignee: Tata Consultancy Sendees Limited, Mumbai (IN)

( * ) Notice: Subject to any disclaimer, the term of this patent is extended or adjusted under 35 U.S.C. 154(b) by 0 days.

(21) Appl. No.: 17/663,825

(22) Filed: May 17, 2022

(65) Prior Publication Data
US 2023/0041301 A1    Feb. 9, 2023

(30) Foreign Application Priority Data
Jul. 2, 2021    (IN) .............. 202121029867

(51) Int. Cl.
*H04L 41/0663*    (2022.01)
*H04L 41/042*    (2022.01)
(Continued)

(52) U.S. Cl.
CPC ........ *H04L 41/0663* (2013.01); *H04L 41/042* (2013.01); *H04L 41/0659* (2013.01); *H04L 43/0817* (2013.01); *H04L 67/51* (2022.05)

(58) Field of Classification Search
CPC .............. H04L 41/0663; H04L 41/042; H04L 41/0659; H04L 43/0817; H04L 67/51
(Continued)

(56) References Cited

U.S. PATENT DOCUMENTS

| 2018/0034839 A1* | 2/2018 | Ahuja | H04L 63/20 |
| 2019/0320038 A1* | 10/2019 | Walsh | G06F 9/542 |
| 2021/0232390 A1* | 7/2021 | Hwang | H04L 41/40 |

FOREIGN PATENT DOCUMENTS

CN    108418862 A    8/2018

OTHER PUBLICATIONS

Noor, Ayman et al., "A Framework for Monitoring Microservice-Oriented Cloud Applications in Heterogeneous Virtualization Environments", Scientific Reports, Date: Jul. 2019, Publisher: IEEE, https://www.researchgate.net/publication/335498056_A_Framework_for_Monitoring_Microservice-Oriented_Cloud_Applications_in_Heterogeneous_Virtualization_Environments.
(Continued)

*Primary Examiner* — Meng Vang
(74) *Attorney, Agent, or Firm* — Finnegan, Henderson, Farabow, Garrett & Dunner, LLP

(57) ABSTRACT

State of the art networking solutions are tightly coupled and proprietary in nature due to multiple vendors in the networking domain. Embodiments of the present disclosure provide a method and system for management and orchestration of heterogeneous network environment using dynamic, robust and network aware microservices. The method enables a platform for automatically and dynamically identifying appropriate group of microservices in accordance with network type and service type specified by the user, thus providing a solution that generates network aware microservices for each network in the heterogeneous network landscape. Furthermore, the system manages the identified microservices for each of the network by manag-
(Continued)

ing the life cycle of these microservices. The right life cycle management and co-ordination of the microservices for the network is in-line with desired goals/business logic, in a reliable and scalable manner, in heterogeneous network environments.

9 Claims, 10 Drawing Sheets

(51) Int. Cl.
    *H04L 43/0817*    (2022.01)
    *H04L 67/51*       (2022.01)
    *H04L 41/0659*    (2022.01)

(58) Field of Classification Search
    USPC .......................................................... 709/223
    See application file for complete search history.

(56) References Cited

OTHER PUBLICATIONS

De Jesus Martins, Rafael et al., "Micro-service Based Network Management for Distributed Applications", Advanced Information Networking and Applications, Date: Mar. 2020, pp. 922-933, Publisher: Research Gate, http://www.researchgate.net/publication/340242058_Micro-service_Based_Nework_Management_for_Distributed_Applications/link/605b4325299bf1736768434f/download.

* cited by examiner

| User Request | workflow | microservices IDs |
|---|---|---|
| $x1$ | $w_{x1}$ | $m1_{id}^{x1}, m2_{id}^{x1}, ..., ml_{id}^{x1}$ |
| $x2$ | $w_{x2}$ | $m1_{id}^{x2}, m2_{id}^{x2}, ..., ml_{id}^{x2}$ |
| ... | ... | ... |
| $x_t$ | $w_{x_t}$ | $m1_{id}^{x_t}, m2_{id}^{x_t}, ..., ml_{id}^{x_t}$ |

FIG. 7

MANAGEMENT AND ORCHESTRATION OF HETEROGENEOUS NETWORK ENVIRONMENT USING DYNAMIC, ROBUST AND NETWORK AWARE MICROSERVICES

PRIORITY CLAIM

This U.S. patent application claims priority under 35 U.S.C. § 119 to: Indian Patent Application No. 202121029867, filed on 2 Jul. 2021. The entire contents of the aforementioned application are incorporated herein by reference.

TECHNICAL FIELD

The embodiments herein generally relate to communication network management and, more particularly, to a method and system for management and orchestration of heterogeneous network environment using dynamic, robust and network aware microservices.

BACKGROUND

Network management and orchestration requires a lot of services and very close interaction of these services with live environments comprising of various types of networking devices. Depending upon the network environments such as Internet of Things (IoT) networks, Enterprise networks, Cloud networks etc., the scale and complexity varies. In reality, the network landscape of a business organization is heterogeneous in nature comprising of wired networks (Switches, Routers, Firewalls etc.), wireless networks (WiFi, WiFi 6 etc.), service provider networks (Transport, Over the Top (OT)), cellular networks (3G HSPA, 4G LTE, 5G) etc. These heterogeneous networks are clustered in different independent network segments which are required to achieve specific business goals.

Many of the network aware services required for management, orchestration and enhancement can be provided by means of microservices. However, network landscape is growing and has brought in large variation in the network type being deployed by an entity. Microservices required for an independent network have to be designed specifically for addressing organizational goals. Most of the existing network management systems are developed for specific needs, are tightly coupled and are proprietary in nature. Thus, the technical problem of dynamically handling management and orchestration of varying network landscape through microservices is hardly addressed by the existing systems. Further, managing the life-cycle of these network aware microservices needs to be smooth to ensure end user satisfaction. Further, co-ordination among identified microservices is also a major factor in achieving the desired goals/business logic in a reliable and scalable manner in heterogeneous network environments.

SUMMARY

Embodiments of the present disclosure present technological improvements as solutions to one or more of the above-mentioned technical problems recognized by the inventors in conventional systems.

For example, in one embodiment, a method for management and orchestration of heterogeneous network environment using dynamic, robust and network aware microservices is provided.

The method includes performing steps via a Control Unit (CU), the steps include detecting an event triggered for a network among a plurality of heterogeneous networks identified by the CU, wherein the event is one of a) a service request for the network and b) a network condition captured by network monitoring tools. Further, the steps include discovering network information using one of a) auto discovery functionality if supported by the network, and b) network information provided in the service request. Furthermore, includes obtaining a service information from the event based on one of a) the service information explicitly specified in the service request and b) the service information derived by the CU based on the network condition, wherein the service information specifies a list of service types from among a plurality of service types, and wherein a service type among the list of service types is associated with a label comprising one of i) a critical service and ii) a non-critical service. Further includes identifying a microservice list for each of the plurality of service types in accordance with a) the service type, b) the label and c) the discovered network information. Furthermore, includes creating a) one or more Fault Tolerance Groups (FTGs) comprising a first set of microservices from among the identified microservice list for each of the plurality of service types that is tagged as critical and b) one or more Scalability Groups (SCGs) comprising a second set of microservices among the identified microservice list for each of the plurality of service types that are tagged as non-critical. The grouping of the first set of microservices in the one or more FTGs and second set of microservices in the one or more SCGs is dynamically interchanged based on at least one of a) change in the network condition and b) change in the label on detected in an updated service request. A master-slave multi-tier combination of microservices in the first set of microservices for the one or more FTGs is dynamically identified by the CU. Further, the CU creates a plurality of workflows for the first set of microservices of the one or more FTGs and the second set of microservices of the one or more SCGs and mapping the plurality of workflows to corresponding first set of microservices and the second set of microservices. Furthermore, the steps include deploying the first set of microservices of the one or more FTGs and the second set of microservices of the one or more SCGs for the network via an Infrastructure as a Service (IaaS) platform, wherein for each of the deployed FTGs and SCGs there exists an intra-group communication, inter-group communication and communication with the CU via a communication unit, and wherein coordination among the first set of microservices or the second set of microservices, and management of coordination by the CU is performed via a coordination unit. Thereafter, the steps include managing a life cycle of the deployed first set of microservices and the second set of microservices comprising: a) configuring one or more of the first set of microservices and one or more of the second set of microservices with initial configurations, wherein the one or more of the first set of microservices and the one or more of the second set of microservices when configured are in idle state; b) monitoring health of the one or more of the first set of microservices and the one or more of the second set of microservices via the network monitoring tools running currently performing tasks assigned in accordance with the mapped workflows, wherein the one or more of the first set of microservices and the one or more of the second set of microservices when running are in busy state; c) dynamically updating the initial configuration by interrupting the running one or more of the first set of microservices and one or more of the second set of microservices by re-configuring, wherein the one or more of the first set of microservices and the one or more of the second set of microservices when re-configured are shifted back to idle state; and d) removing the one or more of the first set of microservices and the one or more of the second set of microservices from the microservice list on completion of the tasks.

The CU comprises a primary CU and a secondary CU, wherein the primary CU operates in active mode to perform the network management and orchestration of the network, while the secondary CU operates in a standby mode, wherein the secondary CU communicates with the primary CU for tracking events of the primary CU, and wherein the secondary CU seamlessly takes control on failure of the primary CU based on the tracked events. Further, the CU operates in a distributed environment mode for management and orchestration of the plurality of heterogeneous networks, wherein each of the plurality of heterogeneous networks is controlled by a corresponding primary CU and a corresponding secondary CU, wherein the corresponding primary CU of each of the plurality of heterogeneous networks communicates with each other for tracking the events, and wherein a first primary CU associated with a first network among the plurality of heterogeneous networks seamlessly takes control on failure of a second primary CU associated with a second network among the plurality of heterogeneous networks based on the tracked events.

In another aspect, a system for management and orchestration of heterogeneous network environment using dynamic, robust and network aware microservices is provided. The system comprises a memory storing instructions; one or more Input/Output (I/O) interfaces; and one or more hardware processors coupled to the memory via the one or more I/O interfaces, wherein the CU executed by the one or more hardware processors is configured by the instructions to detect an event triggered for a network among a plurality of heterogeneous networks identified by the CU, wherein the event is one of a) a service request for the network and b) a network condition captured by network monitoring tools. Further, the CU is configured to discover network information using one of a) auto discovery functionality if supported by the network, and b) network information provided in the service request. Furthermore, the method includes obtaining a service information from the event based on one of a) the service information explicitly specified in the service request and b) the service information derived by the CU based on the network condition, wherein the service information specifies a list of service types from among a plurality of service types, and wherein a service type among the list of service types is associated with a label comprising one of i) a critical service and ii) a non-critical service. Further the CU is configured to identify a microservice list for each of the plurality of service types in accordance with a) the service type, b) the label and c) the discovered network information. Furthermore, the CU is configured to create a) one or more Fault Tolerance Groups (FTGs) comprising a first set of microservices from among the identified microservice list for each of the plurality of service types that is tagged as critical and b) one or more Scalability Groups (SCGs) comprising a second set of microservices among the identified microservice list for each of the plurality of service types that are tagged as non-critical. The grouping of the first set of microservices in the one or more FTGs and second set of microservices in the one or more SCGs is dynamically interchanged based on at least one of a) change in the network condition and b) change in the label on detected in an updated service request. A master-slave multi-tier combination of microservices in the first set of microservices for the one or more FTGs is dynamically identified by the CU. Further, the CU creates a plurality of workflows for the first set of microservices of the one or more FTGs and the second set of microservices of the one or more SCGs and mapping the plurality of workflows to corresponding first set of microservices and the second set of microservices. Furthermore, the CU is configured to deploy the first set of microservices of the one or more FTGs and the second set of microservices of the one or more SCGs for the network via an Infrastructure as a Service (IaaS) platform, wherein for each of the deployed FTGs and SCGs there exists an intra-group communication, inter-group communication and communication with the CU via a communication unit, and wherein coordination among the first set of microservices or the second set of microservices, and management of coordination by the CU is performed via a coordination unit. Thereafter, the CU is configured to manage a life cycle of the deployed first set of microservices and the second set of microservices comprising: a) configuring one or more of the first set of microservices and one or more of the second set of microservices with initial configurations, wherein the one or more of the first set of microservices and the one or more of the second set of microservices when configured are in idle state; b) monitoring health of the one or more of the first set of microservices and the one or more of the second set of microservices via the network monitoring tools running currently performing tasks assigned in accordance with the mapped workflows, wherein the one or more of the first set of microservices and the one or more of the second set of microservices when running are in busy state; c) dynamically updating the initial configuration by interrupting the running one or more of the first set of microservices and one or more of the second set of microservices by reconfiguring, wherein the one or more of the first set of microservices and the one or more of the second set of microservices when re-configured are shifted back to idle state; and d) removing the one or more of the first set of microservices and the one or more of the second set of microservices from the microservice list on completion of the tasks.

The CU comprises a primary CU and a secondary CU, wherein the primary CU operates in active mode to perform the network management and orchestration of the network, while the secondary CU operates in a standby mode, wherein the secondary CU communicates with the primary CU for tracking events of the primary CU, and wherein the secondary CU seamlessly takes control on failure of the primary CU based on the tracked events. Further, the CU operates in a distributed environment mode for management and orchestration of the plurality of heterogeneous networks, wherein each of the plurality of heterogeneous networks is controlled by a corresponding primary CU and a corresponding secondary CU, wherein the corresponding primary CU of each of the plurality of heterogeneous networks communicates with each other for tracking the events, and wherein a first primary CU associated with a first network among the plurality of heterogeneous networks seamlessly takes control on failure of a second primary CU associated with a second network among the plurality of heterogeneous networks based on the tracked events.

In yet another aspect, there are provided one or more non-transitory machine-readable information storage mediums comprising one or more instructions, which when executed by one or more hardware processors causes a method for management and orchestration of heterogeneous network environment using dynamic, robust and network aware microservices. The method includes performing steps via a Control Unit (CU), the steps include detecting an event triggered for a network among a plurality of heterogeneous networks identified by the CU, wherein the event is one of a) a service request for the network and b) a network condition captured by network monitoring tools. Further, the steps include discovering network information using one of a) auto discovery functionality if supported by the network, and b) network information provided in the service request. Furthermore, includes obtaining a service information from the event based on one of a) the service information explicitly specified in the service request and b) the service information derived by the CU based on the network condition, wherein the service information specifies a list of service types from among a plurality of service types, and wherein a service type among the list of service types is associated with a label comprising one of i) a critical service and ii) a non-critical service. Further includes identifying a microservice list for each of the plurality of service types in accordance with a) the service type, b) the label and c) the discovered network information. Furthermore, includes creating a) one or more Fault Tolerance Groups (FTGs) comprising a first set of microservices from among the identified microservice list for each of the plurality of service types that is tagged as critical and b) one or more Scalability Groups (SCGs) comprising a second set of microservices among the identified microservice list for each of the plurality of service types that are tagged as non-critical. The grouping of the first set of microservices in the one or more FTGs and second set of microservices in the one or more SCGs is dynamically interchanged based on at least one of a) change in the network condition and b) change in the label on detected in an updated service request. A master-slave multi-tier combination of microservices in the first set of microservices for the one or more FTGs is dynamically identified by the CU. Further, the CU creates a plurality of workflows for the first set of microservices of the one or more FTGs and the second set of microservices of the one or more SCGs and mapping the plurality of workflows to corresponding first set of microservices and the second set of microservices. Furthermore, the steps include deploying the first set of microservices of the one or more FTGs and the second set of microservices of the one or more SCGs for the network via an Infrastructure as a Service (IaaS) platform, wherein for each of the deployed FTGs and SCGs there exists an intra-group communication, inter-group communication and communication with the CU via a communication unit, and wherein coordination among the first set of microservices or the second set of microservices, and management of coordination by the CU is performed via a coordination unit. Thereafter, the steps include managing a life cycle of the deployed first set of microservices and the second set of microservices comprising: a) configuring one or more of the first set of microservices and one or more of the second set of microservices with initial configurations, wherein the one or more of the first set of microservices and the one or more of the second set of microservices when configured are in idle state; b) monitoring health of the one or more of the first set of microservices and the one or more of the second set of microservices via the network monitoring tools running currently performing tasks assigned in accordance with the mapped workflows, wherein the one or more of the first set of microservices and the one or more of the second set of microservices when running are in busy state; c) dynamically updating the initial configuration by interrupting the running one or more of the first set of microservices and one or more of the second set of microservices by reconfiguring, wherein the one or more of the first set of microservices and the one or more of the second set of microservices when re-configured are shifted back to idle state; and d) removing the one or more of the first set of microservices and the one or more of the second set of microservices from the microservice list on completion of the tasks.

The CU comprises a primary CU and a secondary CU, wherein the primary CU operates in active mode to perform the network management and orchestration of the network, while the secondary CU operates in a standby mode, wherein the secondary CU communicates with the primary CU for tracking events of the primary CU, and wherein the secondary CU seamlessly takes control on failure of the primary CU based on the tracked events. Further, the CU operates in a distributed environment mode for management and orchestration of the plurality of heterogeneous networks, wherein each of the plurality of heterogeneous networks is controlled by a corresponding primary CU and a corresponding secondary CU, wherein the corresponding primary CU of each of the plurality of heterogeneous networks communicates with each other for tracking the events, and wherein a first primary CU associated with a first network among the plurality of heterogeneous networks seamlessly takes control on failure of a second primary CU associated with a second network among the plurality of heterogeneous networks based on the tracked events.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 7 depicts an example deployment list created by the system of FIG. 1 for managing and orchestrating of a network from among the heterogeneous network environment identified by the system, in accordance with some embodiments of the present disclosure.

Figure 1:
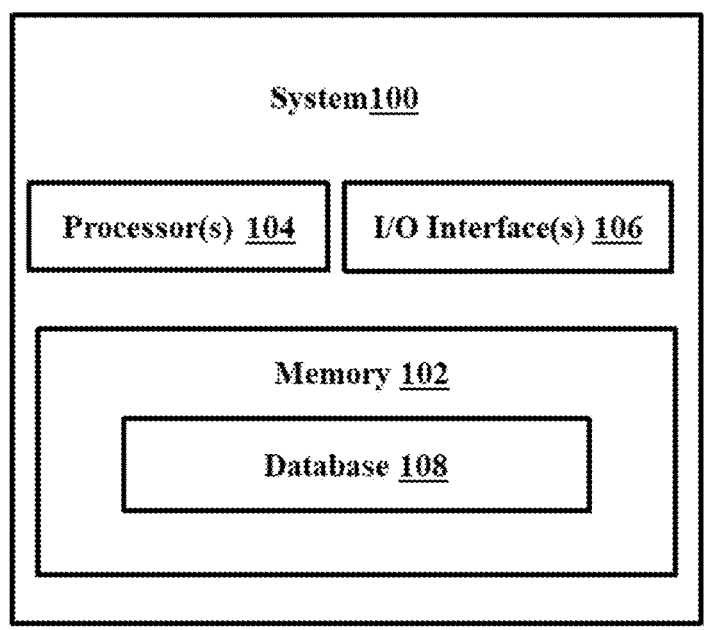
FIG. 1 is a functional block diagram of a system, for management and orchestration of heterogeneous network environment using dynamic, robust and network aware microservices, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method and system for management and orchestration of heterogeneous network environment using dynamic, robust and network aware microservices. Network aware microservices herein refer to right selection of microservices in accordance with the type of network to be serviced. The method and system disclosed herein enables automatically and dynamically identifying appropriate group of microservices in accordance with network type and service type specified by the user, thus providing a solution that generates network aware microservices for each network in the heterogeneous network landscape. Furthermore, the system manages the identified microservices for each of the network by managing the life cycle of these microservices. The right life cycle management and co-ordination of the microservices for the network is performed in-line with desired goals/business logic, in a reliable and scalable manner, in heterogeneous network environments. The system disclosed is highly distributed, dynamic, and robust in nature for management and orchestration of network aware microservices. Thus, the method provides a platform which can seamlessly manage any large network landscape which is combination of multiple independent network segments comprising of heterogeneous networking technologies and products.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 is a functional block diagram of a system 100, for management and orchestration of heterogeneous network environment using dynamic, robust and network aware microservices, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like. In an embodiment the system 100 can be a distributed computing system as explained in conjunction with FIG. 6.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices. The system 100 can connect with external modules of the system such as Infrastructure as a Service (IaaS) platform, third party sources and the like via the I/O interface.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores information of a plurality of heterogeneous networks identified by the system 100. For example, the information includes characteristics of the wired and wireless networks. Further, the memory 102 includes modules also referred to as units such as a control Unit (CU), a communication unit and a coordination unit, explained in conjunction with FIG. 3. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with FIG. 2 through FIG. 9.

Figure 2A:
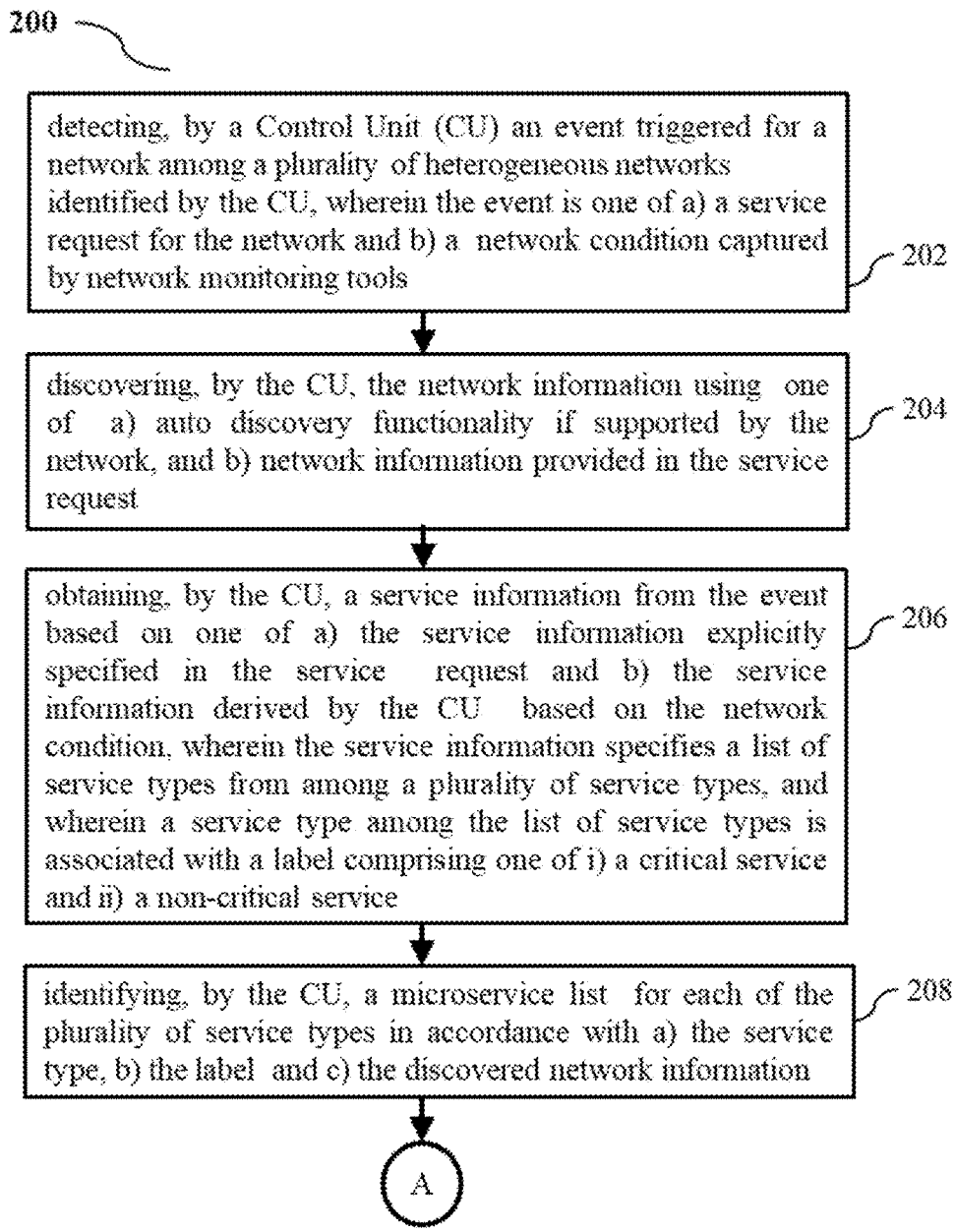
FIGS. 2A and 2B (collectively referred as FIG. 2) is a flow diagram illustrating a method for management and orchestration of heterogeneous network environment using dynamic, robust and network aware microservices, using the system of FIG. 1, in accordance with some embodiments of the present disclosure.
Figure 2B:
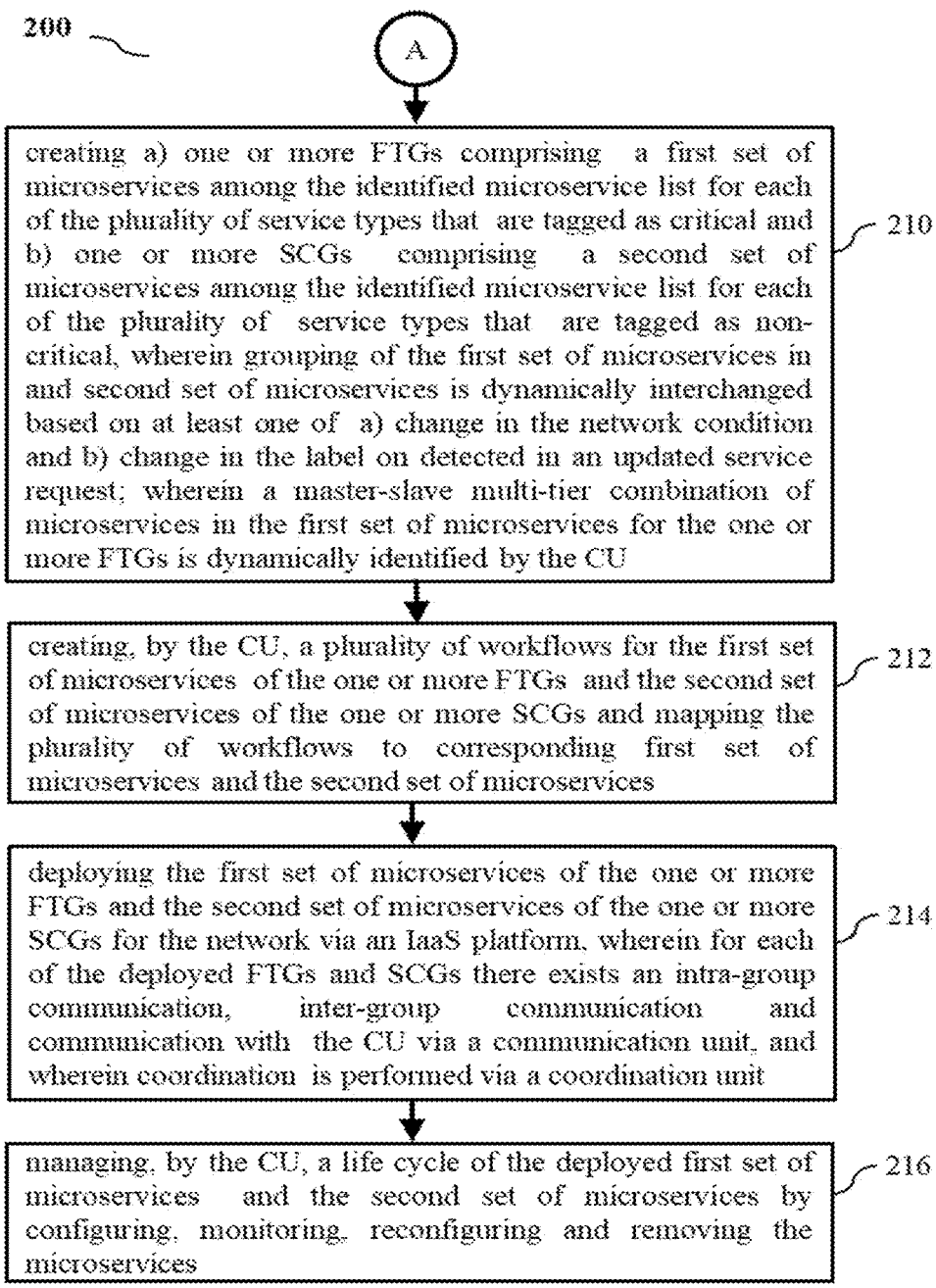

FIGS. 2A and 2B (collectively referred as FIG. 2) is a flow diagram illustrating a method for management and orchestration of heterogeneous network environment using dynamic, robust and network aware microservices, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and architecture of the system as in FIG. 3 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 4:
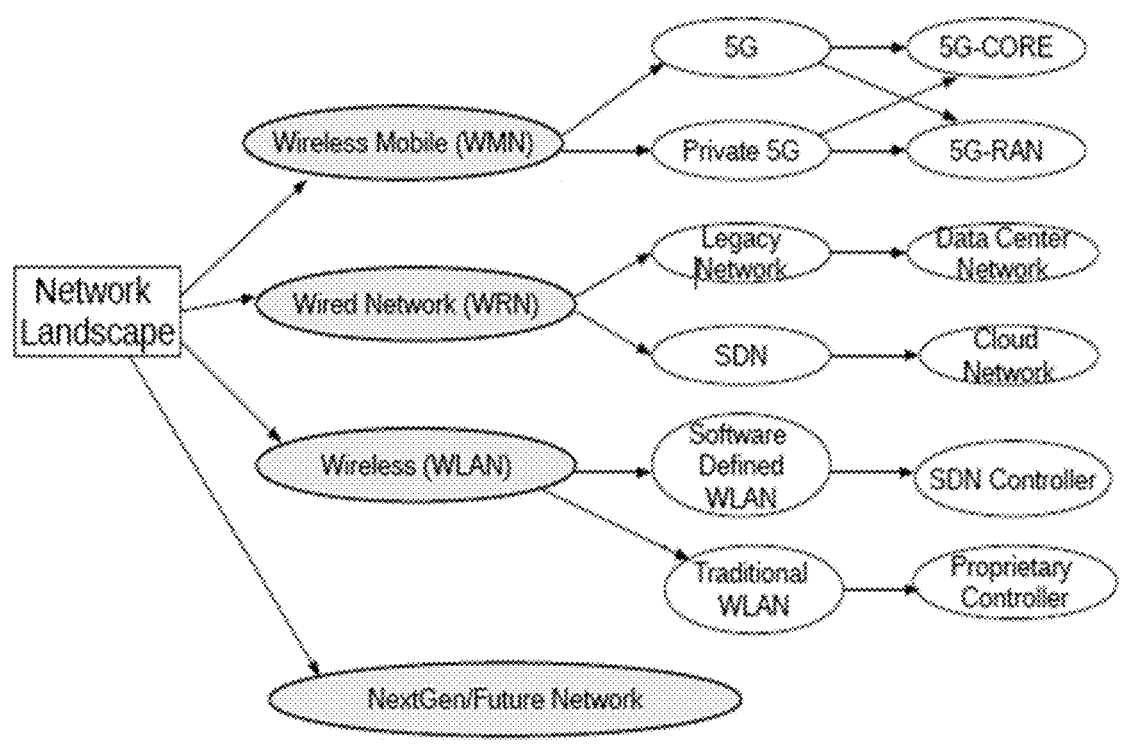
FIG. 4 illustrates an example network landscape of heterogenous networks identified by the system of FIG. 1, in accordance with some embodiments of the present disclosure.

The plurality of heterogeneous network identified or the network landscape identified by the system 100 includes, but is not limited to IoT networks, Enterprise networks, Cloud networks etc. wherein the scale and complexity varies. As mentioned, the network landscape of a business organization is heterogeneous in nature comprising of wired networks (Switches, Routers, Firewalls etc.), wireless networks (WiFi, WiFi 6 etc.), service provider networks (Transport, Over the Top (OT)), cellular networks (3G HSPA, 4G LTE, 5G) etc. These heterogeneous networks are clustered in different independent network segments which are required to achieve specific business goals. An example network landscape is depicted in FIG. 4, as understood by person ordinarily skilled in the art. The system disclosed herein provides the platform for management and orchestration of services required by these heterogeneous networks in an organization, enhancing the customer experience by providing ease of management rather than having multiple systems for managing and orchestrating multiple types of independent network segments within the organization. The independent network segment of an organization is interchangeably referred herein as networks.

Figure 3:
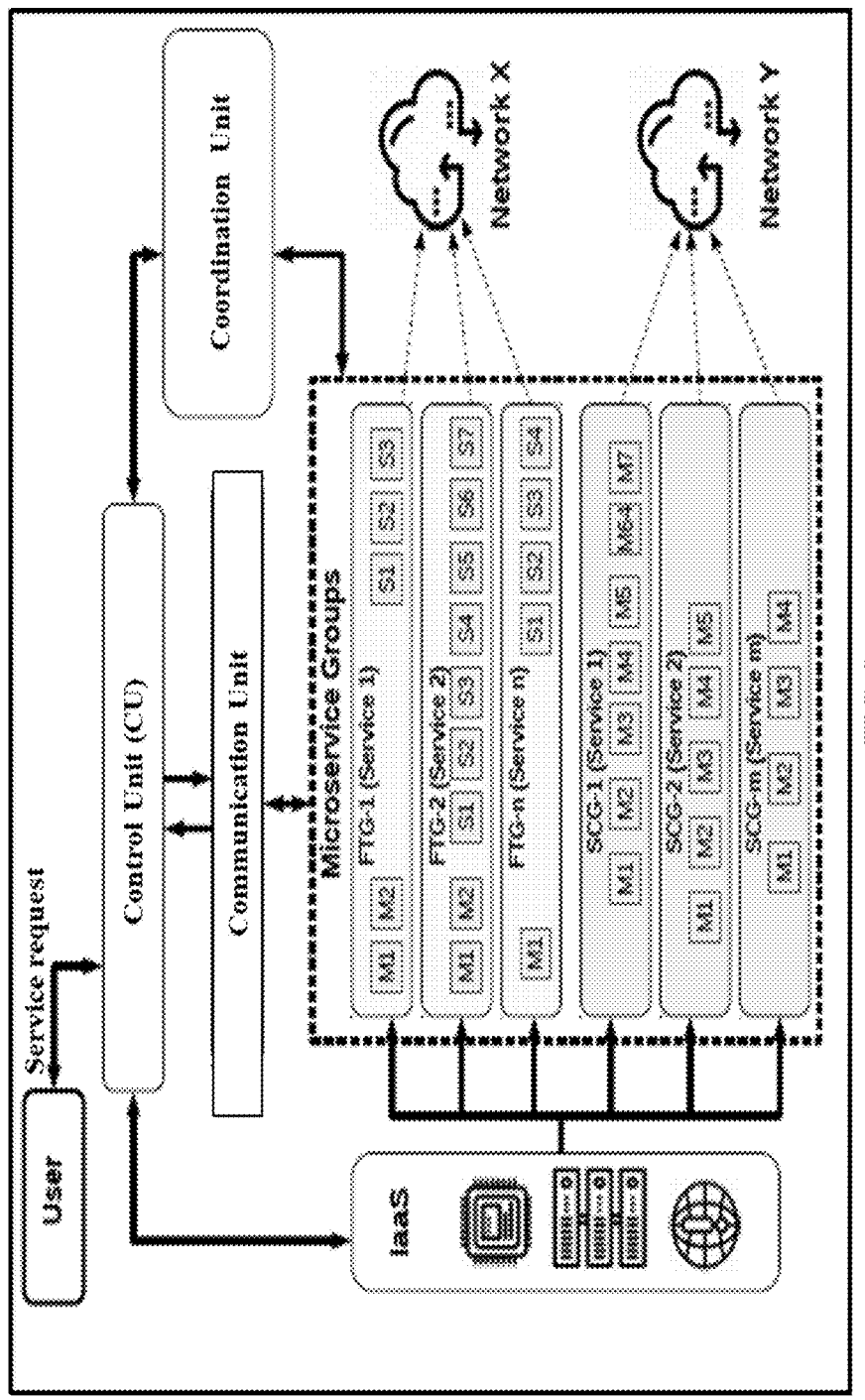
FIG. 3 illustrates an architectural overview of the system of FIG. 1, in accordance with some embodiments of the present disclosure.

FIG. 3 illustrates an architectural overview of the system of FIG. 1, in accordance with some embodiments of the present disclosure. As depicted, the system 100 architecture is explained in conjunction with management and orchestration of microservices for a single network among the plurality of heterogeneous networks managed by the system, while simultaneous management of network aware microservices for multiple networks via a distributed environment of system 100 is explained in conjunction with FIG. 6.

Referring to the FIG. 2, the steps of method 200 can be better understood with an example network (independent network segment), for which network aware microservices are being managed and orchestrated by the system 100. The example network herein is a Wireless-LAN (WLAN), spread over multiple floors (four floors) of an office space of an organization and having 15 Wi-Fi Access Points (APs) with combined capacity of serving a load of 60 stations (end devices). The system 100 has to manage and orchestrate the services for WLAN in accordance with user service requests or network conditions. The network conditions in the example herein are the WLAN network characteristics such as Received Signal Strength Indicator (RSSI) values at each end device or station. Further, example trigger events can a) based on mobility of the user (station) or b) any change in user application requirements or the like. Thus, these events change the network conditions of the respective users and system 100 needs to manage and orchestrate microservices to maintain the user experience.

Referring to architecture of FIG. 3 and the steps of the method 200, an event triggered for the network among the plurality of heterogeneous networks is identified by the CU. The event is one of a) a service request for the network and b) a network condition captured by network monitoring tools. Example network monitoring tools refer to any vendor specific or open source software, which periodically collects information about the prevailing network conditions. Specifically, in the WLAN example above, the event refers to the service request raised by user. As described later, the CU that identifies the event is not a single unit but comprises a primary CU, also referred as active controller, backed by a secondary CU for fault tolerance management.

Figure 5:
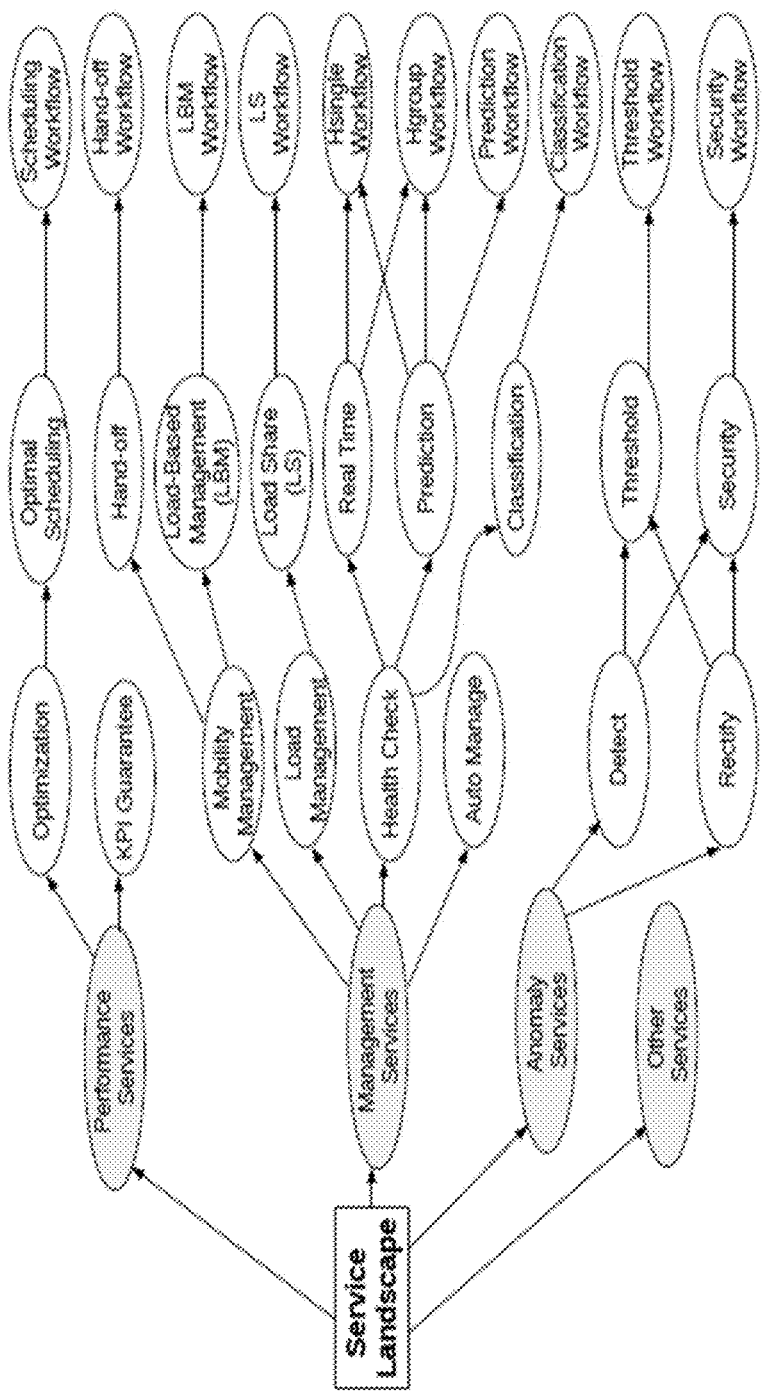
FIG. 5 illustrates an example service landscape managed by the system of FIG. 1, in accordance with some embodiments of the present disclosure.

At step 204 of the method 200, the CU executed by the one or more hardware processors 104 discovers the network information of the corresponding network using an auto discovery functionality, well known in the art, if supported by the network. However, where such functionality is not available, the network information can be provided in the service request by the end user At step 206 of the method 200, the CU executed by the one or more hardware processors 104 obtains, a service information from the event. The service information may be explicitly specified in the service request or the service information can be derived by the CU based on the network type (networking technology). The service information specifies a list of service types from among a plurality of service types. FIG. 5 depicts an example service landscape, as understood by person ordinarily skilled in the art. The service type in the service request is associated with a label comprising one of i) a critical service and ii) a non-critical service. In the WLAN example stated above, the user may raise the service request specifying two service types a) QoS management labelled as a non-critical service while b) Mobility management of the stations across the four floors with label as critical.

Once the service information is extracted, at step 208 the CU identifies a microservice list for each of the plurality of service types in accordance with a) the service type, b) the label and c) the discovered network information (auto discovery or manual discovery). With reference to mobility management (service type), the microservice list will comprise of network characteristic sensing service for corresponding station, analysis service, decision service, handoff service etc. With reference to quality management the microservice list will comprise of the network characteristic sensing service, application characteristic service, analysis service etc.

With the microservice list identified, at step 210 the CU creates a) one or more Fault Tolerance Groups (FTGs) comprising a first set of microservices among the identified microservice list for each of the plurality of service types that are tagged as critical, and b) one or more Scalability Groups (SCGs) comprising a second set of microservices among the identified microservice list for each of the plurality of service types that are tagged as non-critical. The grouping of the first set of microservices in the one or more FTGs and second set of microservices in the one or more SCGs defined initially is not static, but rather can be dynamically interchanged based on either a) change in the network condition and b) change in the label on detected in an updated service request. For the example WLAN above, the system administrator may as need arises, such as "reduction in load as office hours close down", may change the mobility management to non-critical and accordingly the microservices required for mobility management may shift to SCG. Furthermore, for all the microservices identified under the FTGs have a master-slave multi-tier combination of microservices. Unlike the multi-tier combination known in art, which is static, the multi-tier combination herein is dynamically defined by the CU based on criticality of the service and load expected on the service or any other dynamic changes or the network events.

At step 212 of the method 200, the CU executed by the one or more hardware processors 104 creates a plurality of workflows for the first set of microservices of the one or more FTGs and the second set of microservices of the one or more SCGs and mapping the plurality of workflows to corresponding first set of microservices and the second set of microservices. Thus, say the Control Unit receives the service request x, also referred to herein as user request x, for a service, $S_j$ ($i^{th}$ service) on a network, $N_i$ ($i^{th}$ network). Here $S_j \in S$, where $S_j$ is any type of service in system's service landscape. Similarly, $N_i \in N$ where $N_i$ is any type of network (independent network segment) in system's Network Landscape. From the received user request, Control Unit extracts the network and service information. To accomplish the user's service requirement, control unit requires a list of independent functional modules known as the microservices. Hence the Control Unit identifies the list of microservices $M_{(L,x)}$ required for the user request x, where $M_{(L,x)} \in m_1, m_2, \ldots, m_i$ and $m_i$ is one microservice in the list. Further the CU creates a workflow, $w_x$ where the list of tasks are identified by it according to the user provided $N_i$ and $S_j$. The control unit then maps the list of identified microservices, $M_{(L,x)}$ to the workflow, $w_x$. The microservices, mapped to the workflow needs to be deployed in FTGs and the SCGs accordingly.

Thus, at step 214, the CU deploys the first set of microservices of the one or more FTGs and the second set of microservices of the one or more SCGs for the network via the IaaS platform as depicted in FIG. 3. Each of the deployed FTGs and SCGs there exists an intra-group and inter-group communication and communication with the CU via a communication unit. Further, for sake of coordination between the different microservices and management of coordination by the CU a centralized coordination unit is provided. The IaaS platform is very essential for dynamic provisioning of the network aware microservices corresponding to each independent network segment inside network landscape. One or more IaaS platforms can be present across the network landscape and each IaaS helps for hosting microservices on top of Resource Pool (CPU, Memory, Storage and Network). The primary CU or the active controller interacts with IaaS platform by means of suitable APIs or any other interfaces provided. The number of microservices to be hosted, resource to be allocated to each microservice, configuration and role of each microservice, details of the independent network segment the microservice needs to operate on, upscaling and downscaling of each microservice etc., are handled by the active controller of corresponding control unit. Transferring the responsibilities of one microservice group to another is also handled by the active controller.

Before communicating to IaaS for the deployment of microservices, the CU generates a deployment list, where a map of user request, x to the deployed or going to be deployed microservices IDs in a current workflow, $w_x$ is created, as shown FIG. 7. Further the control unit communicates with IaaS and instructs the same for deploying the identified list of microservices, $M_{(L,x)}$. Upon successful deployment by IaaS, an unique ID, $ml_{id}^x$ is generated for each microservice, $ml^x$ and mapped to the workflow, $w_x$. The IaaS communicates back the respective microservice ID, to the Control Unit, which further updates the map entry with respect to workflow as shown in table 1. After successful deployment of the list of microservices, $M_{(L,x)}$, the Control Unit configures them via Communication System and further manages a life cycle of the microservices.

Thus, at step 216, the CU manages the life cycle of the deployed first set of microservices and the second set of microservices. The life cycle management comprises following steps:

a) Configure one or more of the first set of microservices and one or more of the second set of microservices with initial configurations, wherein the one or more of the first set of microservices and the one or more of the second set of microservices when configured are in idle state.

b) Monitor health of the one or more of the first set of microservices and the one or more of the second set of microservices via the network monitoring tools running currently performing tasks assigned in accordance with the mapped workflows. The one or more of the first set of microservices and the one or more of the second set of microservices when running are in busy state.

c) Dynamically update the initial configuration by interrupting the running one or more of the first set of microservices and one or more of the second set of microservices by reconfiguring. The one or more of the first set of microservices and the one or more of the second set of microservices when re-configured are shifted back to idle state.

d) Removing the one or more of the first set of microservices and the one or more of the second set of microservices from the microservice list on completion of the tasks.

Figure 8:
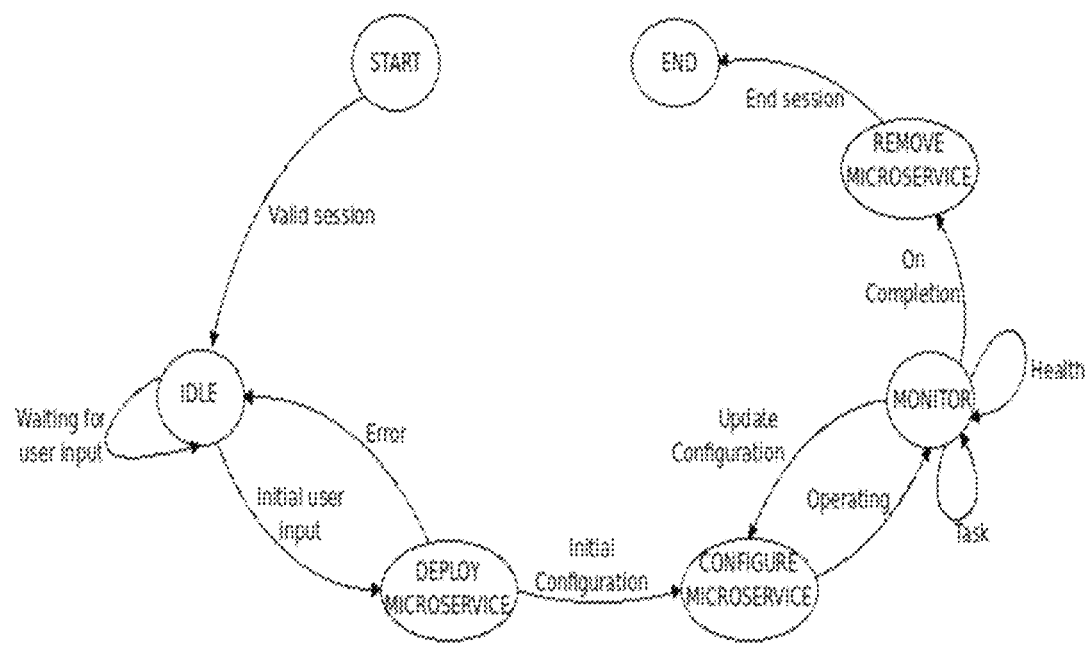
FIG. 8 depicts an example state diagram of a Control Unit (CU) of the system of FIG. 1 while handling management and orchestration of the network for a received service request via one or more microservices, in accordance with some embodiments of the present disclosure.

FIG. 8. depicts an example state diagram of a Control Unit (CU) of the system of FIG. 1 while handling management and orchestration of the network for a received service request via one or more microservices, in accordance with some embodiments of the present disclosure. The states that CU undergoes while serving a single user request or service request are:
1. START
2. IDLE
3. DEPLOY MICROSERVICE
4. CONFIGURE MICROSERVICE
5. MONITOR
6. REMOVE MICROSERVICE
7. END Initially when Control Unit is ready to serve any user's request it is in the START state. As soon as the user login to the System and the user session is validated by Control Unit, it transitions from START to IDLE state where it waits for the user to provide the Network and Service requirements. Upon receiving the initial user input, it transitions to DEPLOY MICROSERVICE state, then as mentioned the CU identifies the list of microservices, creates workflow, maps the list of microservices to workflow and communicate to IaaS to deploy the microservices. If any error happens during these process, the Control Unit goes back to IDLE state.

Figure 9:
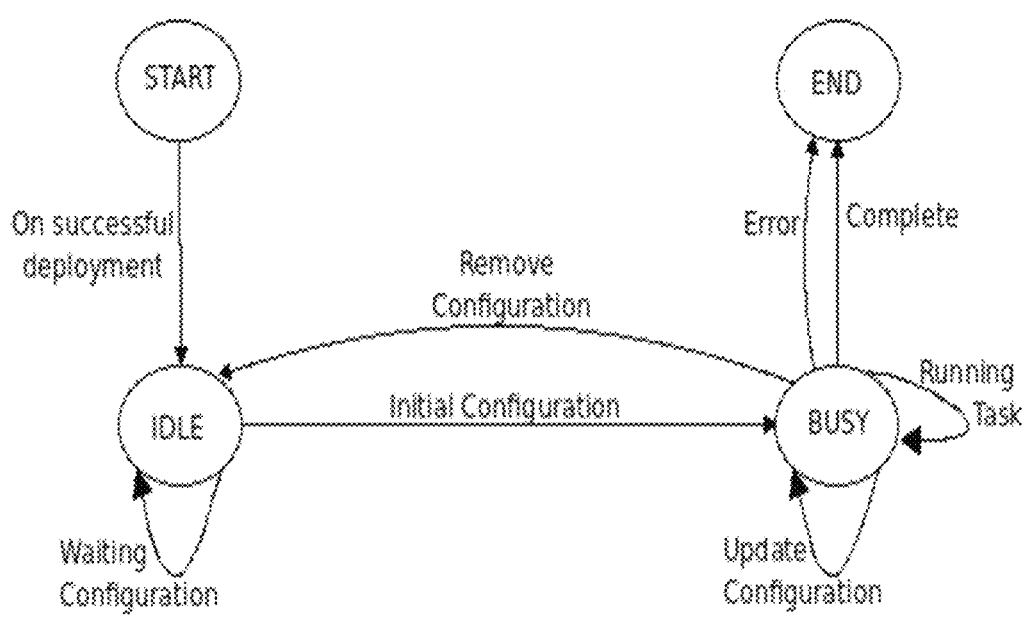
FIG. 9 depicts an example state diagram of a microservice among a plurality of microservices identified for the network in accordance with the service request, in accordance with some embodiments of the present disclosure.

FIG. 9. depicts an example state diagram of a microservice among a plurality of microservices identified for the network in accordance with the service request, in accordance with some embodiments of the present disclosure.

However, on successful deployment of microservices the Control Unit transition into CONFIGURE MICROSERVICE state. In this state it configures the microservices with the initial configurations. Post this, the microservices starts operating with initial received configurations and Control Unit (CU) transitions to MONITOR state. In this state, it monitors the health of the microservice and also monitors the task assigned to them. However, for the current user request if the CU receives any change in service information, it triggers an update configuration action and transition back to CONFIGURE MICROSERVICE state from MONITOR state. On completion of the tasks, it transitions from MONITOR to REMOVE MICROSERVICE state. In this state it communicates to IaaS to remove the deployed microservices from the Microservice Groups (MGs). Further when the session ends, the CU transitions to END state.

FIG. 9. depicts an example state diagram of a microservice among a plurality of microservices identified for the network in accordance with the service request, in accordance with some embodiments of the present disclosure. When the IaaS initiates the deployment of a microservice it is in the START state. Upon successful deployment of the microservice, it transits to the IDLE state. In this state the microservice waits for any configuration from the Control Unit. Further after receiving the initial configuration from Control Unit, it transits to BUSY state. In BUSY state it runs the actual task for which microservice is deployed. While running any task if Control Unit sends any update in configuration that is also handled by the microservice in this state. However, in case of removal of configuration the microservice transits to IDLE state from BUSY state. On completion of the task or in case of any error the microservice transits from BUSY to END state.

Referring back to architecture of the system 100 in FIG. 3, the Control Unit is responsible for life-cycle management of the network aware microservices and co-operation with control units of other independent network segments. Thus, rather than a single standalone unit, the CU is split as the primary CU and the secondary CU, wherein the primary CU operates in active mode to perform the network management and orchestration of the network, while the secondary CU operates in a standby mode. The secondary CU communicates with the primary CU for tracking events of the primary CU, and wherein the secondary CU seamlessly takes control on failure of the primary CU based on the tracked events. Thus, for reliability and fault-tolerance, the primary and secondary controller units are provided in each control unit where the secondary controller is inactive and receives update about all events from primary controller. Secondary controller becomes active only if primary fails. The control unit (CU) also acts as a cognitive brain, where it learns the network functionalities or parameters and application requirement over time, and intelligently orchestrates the desired/necessary microservices in a semi-autonomic manner. Thus, the network management and orchestration mechanism is assisted with prior knowledge of the network, applications, protocols, and standards.

Figure 6:
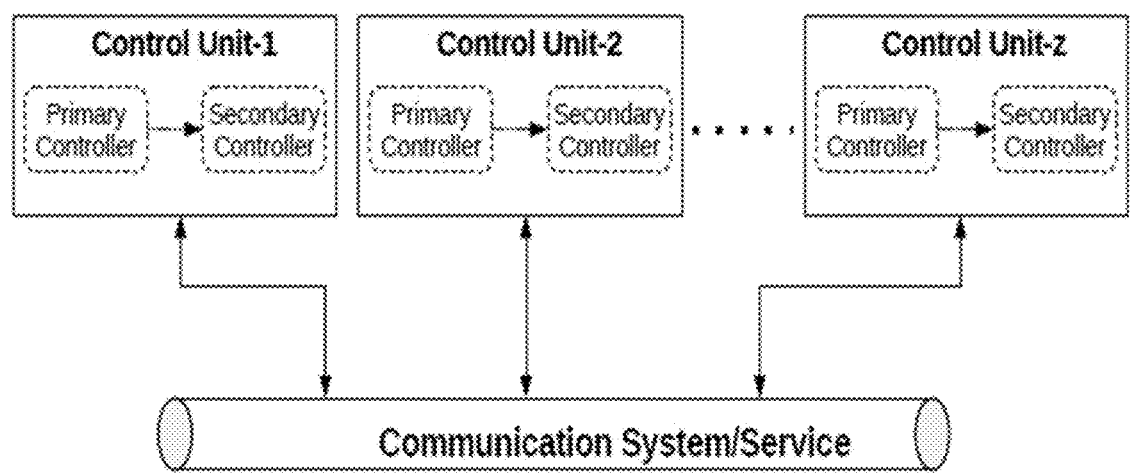
FIG. 6 depicts an example architecture of distributed environment of the system of FIG. 1 for simultaneously managing and orchestrating a plurality of heterogeneous networks in a network landscape of the system, in accordance with some embodiments of the present disclosure.

FIG. 6. depicts an example architecture of distributed environment of the system of FIG. 1 for simultaneously managing and orchestrating a plurality of heterogeneous networks in a network landscape of the system, in accordance with some embodiments of the present disclosure. There is a co-operation amongst the different primary control units (active controllers) in control units of multiple independent network segments (networks) by means of periodic message exchange related to microservices activated, utilization, event notifications etc. The responsibilities of the active controller of a control unit in one independent network segment can be offloaded to active controller of corresponding control unit in any other independent network segments in case of total failure (primary and secondary fail) or high service load.

Thus, it can be understood that communication unit is responsible for communication services that provide messaging for intra-group microservices communication (between different microservices), communication between microservices and the active controller of corresponding control unit and microservices to any third party component communication. A standard publish-subscribe messaging platform is used because of the large number of message exchanges take place among the entities, modules, and units of system 100. Creation of individual communication channels based on the needs and adding/removing subscribers to communication channel is handled by the active controller via the messaging system interfaces.

Co-ordination unit providing coordination services: Apart from good communication, proper co-ordination amongst the different microservices and the active controller of corresponding control unit is very essential for functioning of the microservice management and orchestration platform disclosed herein. Typical services necessary for co-ordination such as service registry, synchronization, leader election, group management etc., are utilized by means of the standard distributed co-ordination platform. The active controller takes care of providing fault tolerance and scalability for each network aware service by creating one or more Fault Tolerance Groups (FTGs) and Scalability Groups (SCGs). Each FTG comprises of one or more master microservices and one or more slave microservices. The master microservices act upon the service requests and each slave request proxies every received service requests to one of the master. One of the slave microservice is chosen as master when there is a failure event for any one of the master. New FTG is constituted in case of a total failure where no slave microservice is available and the responsibilities of the failed FTG are transferred to the new FTG. Further, in case of SCGs each microservice acts as a master and serves the received service requests. There is a Service Landscape (SL) maintained in each active controller of corresponding control unit and this comprises the details of the services provided by different network aware microservices available for activation (deployment in resource pool of IaaS). Based on the specification in the SL, active controller decides the formation of FTGs and SCGs depending upon the factors such as criticality of the service, nature of service etc.

Thus, method disclosed herein provides dynamic network aware microservices for ease and efficiency of heterogeneous network services/functions. Centralized control for maintaining the microservices life-cycle which comprises of deployment, provisioning, configuration, fault tolerance, scalability etc. is provided. Co-operation among the different local and geographically distributed active controllers (i.e. multiple control units) of each independent network segment (wired or wireless network) for management and orchestration of entire network landscape (set of all independent network segments). Learning based predictions with corresponding services orchestration helps to mitigate bottlenecks or network issues which may arise over the period of time which brings self-organizing nature in network management. Further, any upcoming network technology also can be incorporated by updating the network with network information and corresponding service information of the new network technology, for example adding a new independent 5G network or a WiFi6 network to the organizations existing heterogeneous network environment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for management and orchestration of heterogeneous network environment, the method comprising:

detecting, by a Control Unit (CU) executed by one or more hardware processors, an event triggered for a network among a plurality of heterogeneous networks identified by the CU, wherein the event is one of a) a service request for the network and b) a network condition captured by network monitoring tools;

discovering, by the CU, network information using one of a) auto discovery functionality if supported by the network, and b) network information provided in the service request;

obtaining, by the CU, a service information from the event based on one of a) the service information explicitly specified in the service request and b) the service information derived by the CU based on the network condition, wherein the service information specifies a list of service types from among a plurality of service types, and wherein a service type among the list of service types is associated with a label comprising one of i) a critical service and ii) a non-critical service;

identifying, by the CU, a microservice list for each of the plurality of service types in accordance with a) the service type, b) the label and c) the discovered network information;

creating, by the CU, a) one or more Fault Tolerance Groups (FTGs) comprising a first set of microservices from among the identified microservice list for each of the plurality of service types that is tagged as critical and b) one or more Scalability Groups (SCGs) comprising a second set of microservices among the identified microservice list for each of the plurality of service types that are tagged as non-critical,
      wherein grouping of the first set of microservices in the one or more FTGs and second set of microservices in the one or more SCGs is dynamically interchanged based on at least one of a) change in the network condition and b) change in the label on detected in an updated service request, and
      wherein a master-slave multi-tier combination of microservices in the first set of microservices for the one or more FTGs is dynamically identified by the CU;

creating, by the CU, a plurality of workflows for the first set of microservices of the one or more FTGs and the second set of microservices of the one or more SCGs and mapping the plurality of workflows to corresponding first set of microservices and the second set of microservices;

deploying, by the CU the first set of microservices of the one or more FTGs and the second set of microservices of the one or more SCGs for the network via an Infrastructure as a Service (IaaS) platform, wherein for each of the deployed FTGs and SCGs there exists an intra-group communication, inter-group communication and communication with the CU via a communication unit, and wherein coordination among the first set of microservices or the second set of microservices, and management of coordination by the CU is performed via a coordination unit; and managing, by the CU, a life cycle of the deployed first set of microservices and the second set of microservices comprising:
- a) configuring one or more of the first set of microservices and one or more of the second set of microservices with initial configurations, wherein the one or more of the first set of microservices and the one or more of the second set of microservices when configured are in idle state;
- b) monitoring health of the one or more of the first set of microservices and the one or more of the second set of microservices via the network monitoring tools running currently performing tasks assigned in accordance with the mapped workflows, wherein the one or more of the first set of microservices and the one or more of the second set of microservices when running are in busy state;
- c) dynamically updating the initial configuration by interrupting the running one or more of the first set of microservices and one or more of the second set of microservices by reconfiguring, wherein the one or more of the first set of microservices and the one or more of the second set of microservices when re-configured are shifted back to idle state; and
- d) removing the one or more of the first set of microservices and the one or more of the second set of microservices from the microservice list on completion of the tasks.

2. The method of claim 1, further comprising configuring the CU as a primary CU and a secondary CU, wherein the primary CU operates in active mode to perform the network management and orchestration of the network, while the secondary CU operates in a standby mode, wherein the secondary CU communicates with the primary CU for tracking events of the primary CU, and wherein the secondary CU seamlessly takes control on failure of the primary CU based on the tracked events.

3. The method of claim 2 further comprising operating the CU in a distributed environment mode for management and orchestration of the plurality of heterogeneous networks, wherein each of the plurality of heterogeneous networks is controlled by a corresponding primary CU and a corresponding secondary CU, wherein the corresponding primary CU of each of the plurality of heterogeneous networks communicates with each other for tracking the events, and wherein a first primary CU associated with a first network among the plurality of heterogeneous networks seamlessly takes control on failure of a second primary CU associated with a second network among the plurality of heterogeneous networks based on the tracked events.

4. A system for management and orchestration of heterogeneous network environment, the system comprising:
a memory storing instructions,
one or more Input/Output (I/O) interfaces;
one or more hardware processors coupled to the memory via the one or more I/O interfaces,
a Controller Unit (CU), a communication unit and a coordination unit executed by the one or more hardware processors, wherein the CU is configured by the instructions to:
detect an event triggered for a network among a plurality of heterogeneous networks identified by the CU, wherein the event is one of a) a service request for the network and b) a network condition captured by network monitoring tools;
discover network information using one of a) auto discovery functionality if supported by the network, and b) network information provided in the service request;
obtain a service information from the event based on one of a) the service information explicitly specified in the service request and b) the service information derived by the CU based on the network condition, wherein the service information specifies a list of service types from among a plurality of service types, and wherein a service type among the list of service types is associated with a label comprising one of i) a critical service and ii) a non-critical service;
identify a microservice list for each of the plurality of service types in accordance with a) the service type, b) the label and c) the discovered network information;
create a) one or more Fault Tolerance Groups (FTGs) comprising a first set of microservices from among the identified microservice list for each of the plurality of service types that is tagged as critical and b) one or more Scalability Groups (SCGs) comprising a second set of microservices among the identified microservice list for each of the plurality of service types that are tagged as non-critical,
  wherein grouping of the first set of microservices in the one or more FTGs and second set of microservices in the one or more SCGs is dynamically interchanged based on at least one of a) change in the network condition and b) change in the label on detected in an updated service request, and
  wherein a master-slave multi-tier combination of microservices in the first set of microservices for the one or more FTGs is dynamically identified by the CU;
create a plurality of workflows for the first set of microservices of the one or more FTGs and the second set of microservices of the one or more SCGs and mapping the plurality of workflows to corresponding first set of microservices and the second set of microservices;
deploy the first set of microservices of the one or more FTGs and the second set of microservices of the one or more SCGs for the network via an Infrastructure as a Service (IaaS) platform, wherein for each of the deployed FTGs and SCGs there exists an intra-group communication, inter-group communication and communication with the CU via the communication unit, and wherein coordination among the first set of microservices or the second set of microservices, and management of coordination by the CU is performed via the coordination unit; and
manage a life cycle of the deployed first set of microservices and the second set of microservices by:
- a) configuring one or more of the first set of microservices and one or more of the second set of microservices with initial configurations, wherein the one or more of the first set of microservices and the one or more of the second set of microservices when configured are in idle state;
b) monitoring health of the one or more of the first set of microservices and the one or more of the second set of microservices via the network monitoring tools running currently performing tasks assigned in accordance with the mapped workflows, wherein the one or more of the first set of microservices and the one or more of the second set of microservices when running are in busy state;
c) dynamically updating the initial configuration by interrupting the running one or more of the first set of microservices and one or more of the second set of microservices by reconfiguring, wherein the one or more of the first set of microservices and the one or more of the second set of microservices when re-configured are shifted back to idle state; and
d) removing the one or more of the first set of microservices and the one or more of the second set of microservices from the microservice list on completion of the tasks.

5. The system of claim 4, wherein the CU executed by the one or more hardware processors is configured as a primary CU and a secondary CU, wherein the primary CU operates in active mode to perform the network management and orchestration of the network, while the secondary CU operates in a standby mode, wherein the secondary CU communicates with the primary CU for tracking events of the primary CU, and wherein the secondary CU seamlessly takes control on failure of the primary CU based on the tracked events.

6. The system of claim 5, wherein the CU executed by the one or more hardware processors is configured to operate in a distributed environment mode for management and orchestration of the plurality of heterogeneous networks, wherein each of the plurality of heterogeneous networks is controlled by a corresponding primary CU and a corresponding secondary CU, wherein the corresponding primary CU of each of the plurality of heterogeneous networks communicates with each other for tracking the events, and wherein a first primary CU associated with a first network among the plurality of heterogeneous networks seamlessly takes control on failure of a second primary CU associated with a second network among the plurality of heterogeneous networks based on the tracked events.

7. One or more non-transitory machine-readable information storage mediums comprising one or more instructions which when executed by one or more hardware processors cause:
detecting, by a Control Unit (CU), an event triggered for a network among a plurality of heterogeneous networks identified by the CU, wherein the event is one of a) a service request for the network and b) a network condition captured by network monitoring tools;
discovering, by the CU, network information using one of a) auto discovery functionality if supported by the network, and b) network information provided in the service request;
obtaining, by the CU, a service information from the event based on one of a) the service information explicitly specified in the service request and b) the service information derived by the CU based on the network condition, wherein the service information specifies a list of service types from among a plurality of service types, and wherein a service type among the list of service types is associated with a label comprising one of i) a critical service and ii) a non-critical service;
identifying, by the CU, a microservice list for each of the plurality of service types in accordance with a) the service type, b) the label and c) the discovered network information;
creating, by the CU, a) one or more Fault Tolerance Groups (FTGs) comprising a first set of microservices from among the identified microservice list for each of the plurality of service types that is tagged as critical and b) one or more Scalability Groups (SCGs) comprising a second set of microservices among the identified microservice list for each of the plurality of service types that are tagged as non-critical,
wherein grouping of the first set of microservices in the one or more FTGs and second set of microservices in the one or more SCGs is dynamically interchanged based on at least one of a) change in the network condition and b) change in the label on detected in an updated service request, and
wherein a master-slave multi-tier combination of microservices in the first set of microservices for the one or more FTGs is dynamically identified by the CU;
creating, by the CU, a plurality of workflows for the first set of microservices of the one or more FTGs and the second set of microservices of the one or more SCGs and mapping the plurality of workflows to corresponding first set of microservices and the second set of microservices;
deploying, by the CU the first set of microservices of the one or more FTGs and the second set of microservices of the one or more SCGs for the network via an Infrastructure as a Service (IaaS) platform, wherein for each of the deployed FTGs and SCGs there exists an intra-group communication, inter-group communication and communication with the CU via a communication unit, and wherein coordination among the first set of microservices or the second set of microservices, and management of coordination by the CU is performed via a coordination unit; and
managing, by the CU, a life cycle of the deployed first set of microservices and the second set of microservices comprising:
a) configuring one or more of the first set of microservices and one or more of the second set of microservices with initial configurations, wherein the one or more of the first set of microservices and the one or more of the second set of microservices when configured are in idle state;
b) monitoring health of the one or more of the first set of microservices and the one or more of the second set of microservices via the network monitoring tools running currently performing tasks assigned in accordance with the mapped workflows, wherein the one or more of the first set of microservices and the one or more of the second set of microservices when running are in busy state;
c) dynamically updating the initial configuration by interrupting the running one or more of the first set of microservices and one or more of the second set of microservices by reconfiguring, wherein the one or more of the first set of microservices and the one or more of the second set of microservices when re-configured are shifted back to idle state; and d) removing the one or more of the first set of microservices and the one or more of the second set of microservices from the microservice list on completion of the tasks.

8. The one or more non-transitory machine-readable information storage mediums of claim 7, wherein the method comprises configuring the CU as a primary CU and a secondary CU, wherein the primary CU operates in active mode to perform the network management and orchestration of the network, while the secondary CU operates in a standby mode, wherein the secondary CU communicates with the primary CU for tracking events of the primary CU, and wherein the secondary CU seamlessly takes control on failure of the primary CU based on the tracked events.

9. The one or more non-transitory machine-readable information storage mediums of claim 8, wherein the method further comprises operating the CU in a distributed environment mode for management and orchestration of the plurality of heterogeneous networks, wherein each of the plurality of heterogeneous networks is controlled by a corresponding primary CU and a corresponding secondary CU, wherein the corresponding primary CU of each of the plurality of heterogeneous networks communicates with each other for tracking the events, and wherein a first primary CU associated with a first network among the plurality of heterogeneous networks seamlessly takes control on failure of a second primary CU associated with a second network among the plurality of heterogeneous networks based on the tracked events.

* * * * *